Figure 1:
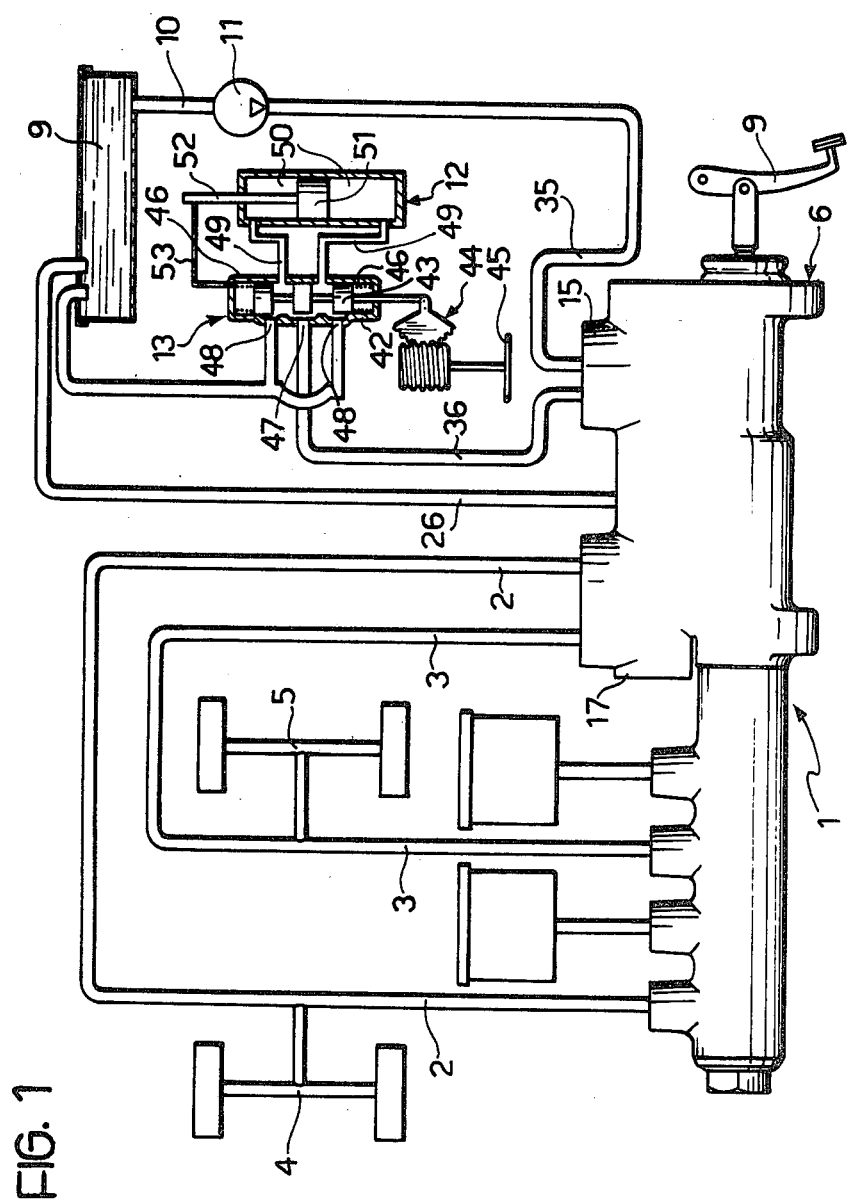

United States Patent [19]

Bertone et al.

[11] 4,362,019
[45] Dec. 7, 1982

[54] MOTOR VEHICLE HYDRAULIC SYSTEM

[75] Inventors: Antonino Bertone, Saluggia; Paolo Vannini, Cambiano, both of Italy

[73] Assignee: Centro Ricerche Fiat S.p.A., Turin, Italy

[21] Appl. No.: 211,534

[22] Filed: Nov. 26, 1980

[30] Foreign Application Priority Data

Dec. 11, 1979 [IT] Italy .............................. 69373 A/79

[51] Int. Cl.³ .......................................... B60T 13/00
[52] U.S. Cl. ................................. 60/547 A; 60/548; 60/555; 137/627.5
[58] Field of Search ................ 60/547 R, 547 A, 548, 60/555, 556; 137/627.5

[56] References Cited

U.S. PATENT DOCUMENTS

| | | | |
|---|---|---|---|
| 3,349,801 | 10/1967 | Grundmann | 137/625.5 |
| 4,123,908 | 11/1978 | Bertone | 60/555 |
| 4,130,990 | 12/1978 | Amedei | 60/548 |
| 4,161,867 | 7/1979 | Adachi | 60/582 |
| 4,203,631 | 5/1980 | Rivetti | 60/548 |

*Primary Examiner*—Abraham Hershkovitz
*Attorney, Agent, or Firm*—Sughrue, Mion, Zinn, Macpeak & Seas

[57] ABSTRACT

A motor vehicle provided with servo-assisted controls for the brakes and steering, has an hydraulic system of the type comprising a volumetric pump the input of which is connected to a reservoir, and first and second distributor devices the first of which is associated with the steering control device and the second of which is associated with the master cylinder for control of the brakes. The said second distributor device is formed in such a way as to function also as a pressure modulating valve.

2 Claims, 2 Drawing Figures

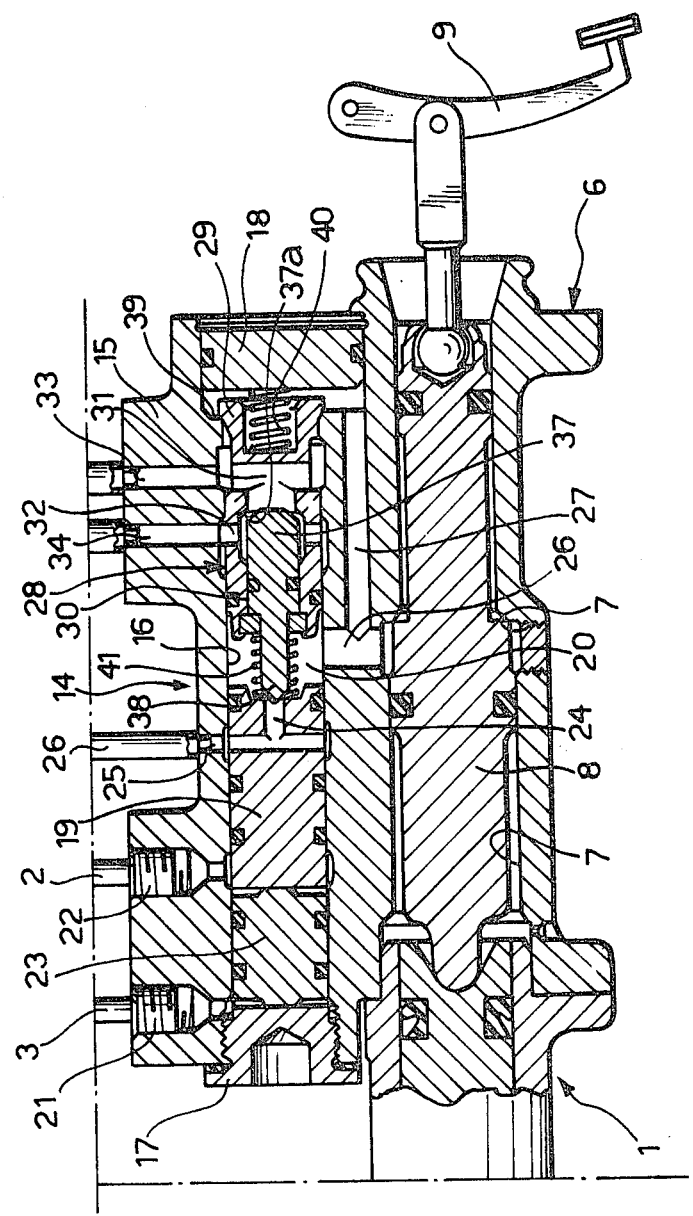

MOTOR VEHICLE HYDRAULIC SYSTEM

The present invention relates to an hydraulic system for a motor vehicle provided with servo-assisted controls for the brakes and the steering, the system being of the type comprising:
- a reservoir,
- a volumetric pump the input of which is connected to the said reservoir,
- a master cylinder having a main piston operable by means of the brake pedal to generate a pressure in the motor vehicle's wheel braking circuit,
- an hydraulic actuator for the control of the steering,
- a first distributor device associated with the said hydraulic actuator, and controlled by the steering wheel of the motor vehicle to transmit the pressure generated by the volumetric pump to the said actuator,
- a second distributor device associated with the brake master cylinder and controlled by the pressure existing in the said braking circuit to transmit the pressure generated by the volumetric pump to the main piston of the master cylinder whereby to assist the force applied to the brake pedal when an increase in pressure occurs in the said braking circuit following operation of the brake pedal; the said second distributor device comprising:
  - a body forming part of the body of the master cylinder and provided with an internal cylindrical cavity,
  - a control piston, slidably and sealingly mounted in the cylindrical cavity, and defining within this cavity a first chamber communicating with the wheel braking circuit of the motor vehicle and a second chamber which communicates both with the said reservoir by means of a passage formed in the control piston and with an input aperture formed in the body of the second distributor device, the said input aperture being connected with the output of the volumetric pump by means of a delivery duct, and with a cavity in the master cylinder in which there is slidably mounted the main piston of the master cylinder and,
  - a valve shutter member cooperating with the mouth of the passage formed in the control piston, to interrupt communication between the second chamber and the reservoir.

A system of the type specified above is described and illustrated in Italian Patent Application No. 68810-A/76, in the corresponding U.S. Pat. No. 4,130,990 and in the corresponding German Patent Application published after examination DAS 27 32 135. The system forming the subject of these Patent documents is provided with a pressure modulating valve which is connected both to the distributor device associated with the master cylinder for the control of the brakes, to the distributor device associated with the steering control device, and also to the volumetric pump forming part of the system.

The object of the present invention is to provide a system of the type specified above, in which the said second distributor device, which is associated with the brake master cylinder is formed in such a way as to function also as the pressure modulating valve, whereby to allow the separate modulating valve forming part of the system according to the known art to be eliminated.

With a view to achieving the above object, the present invention provides an hydraulic system of the type initially specified, characterised by the fact that the said second distributor device further comprises:
- a distributor piston slidably and sealingly mounted in the said second chamber and having a tubular body closed at its end opposite the control piston whereby to divide the second chamber into two parts which both communicate with the interior of the master cylinder,
- a control member slidably and sealingly mounted within the tubular body of the distributor piston whereby to define within the said tubular body a third chamber which communicates by means of radial passages formed in the tubular body both with the said input aperture and with an output aperture formed in the body of the second distributor device, the said output aperture being connected with the said reservoir by means of a return duct in which the said first distributor device is inserted; the end of the said control member which faces the interior of the tubular body being formed as a valve shutter and being cooperable with an annular valve seat formed in the internal surface of the tubular body to interrupt communication between the said input aperture and the said output aperture; the opposite end of the control member being disposed outside the tubular body and constituting the said shutter member; the tubular body of the distributor piston having its closed end formed as a valve shutter displaceable from a cooperating annular valve seat formed in the wall of the said cylindrical cavity, to place said third chamber in communication with the part of the second chamber which lies between the distributor piston and an end wall of the cylindrical cavity,
- first resilient means interposed between the distributor piston and the end wall of the said cylindrical cavity in order to press that end of the distributor piston which is formed as a valve shutter, against its valve seat, and
- second resilient means interposed between the control piston and the distributor piston.

The invention will now be described with reference to the annexed drawings, provided purely by way of nonlimitative example, in which:

FIG. 1 schematically illustrates an hydraulic system according to the present invention, and FIG. 2 illustrates in section a detail of the system of FIG. 1.

In the drawings, reference 1 indicates in its entirety, a master cylinder of known type capable of pressurising two ducts 2, 3 respectively connected to the braking circuits 4,5 of the front wheels and of the rear wheels of a motor vehicle. A master cylinder similar to the cylinder illustrated in the drawings, except for the distributor device which is associated with the master cylinder 1 and which will be described herebelow, forms the subject of the Italian Patent Application No. 69786-A/75 corresponding to U.S. Pat. No. 4,123,908 and the German Patent Application, published after examination DAS 26 51 514. The master cylinder 1 comprises a body 6 having a cylindrical cavity 7 in which there is slidably mounted a main piston 8 connected to a pedal 9 for the control of the brakes of the motor vehicle.

The hydraulic system illustrated comprises a reservoir 9 connected, by means of a duct 10, to the input of a volumetric pump 11, an hydraulic actuator 12 for the control of the steering of the motor vehicle, and a first distributor device 13 associated with the actuator 12.

A second distributor device 14 is associated with the master cylinder 1 and has a body 15 which forms part of the body 6 of the master cylinder 1. A cylindrical cavity 16 is formed within the body 15 with its axis parallel to the axis of the cylindrical cavity. The cavity 16 is closed at its ends by closure elements 17, 18. A control piston 19 is slidably and sealingly mounted within the cylindrical cavity 16 and defines, within the cavity 16, a first chamber lying between the closure element 17 and the facing end surface of the control piston 19, and a second chamber 20. The said first chamber communicates with the ducts 3, 2 by means of two passages 21, 22 formed in the body 15 of the second distributor device. Moreover, an auxiliary control piston 23 is slidably and sealingly mounted in this first chamber and divides the first chamber into two parts communicating with the passages 21 and 22 respectively. The second chamber 20 communicates by means of a passage 24 formed in the control piston 19, and by means of a passage 25 formed in the body 15, with a duct 26 connected to the reservoir 9. This second chamber communicates moreover, at its ends through passages 26, 27 formed in the body 15, with the cylindrical cavity 7 of the master cylinder 1 in which the main piston 8 of the master cylinder is slidably mounted.

A distributor piston 28 is, moreover, slidably and sealingly mounted within the second chamber 20. The piston 28 has a tubular body closed at its end opposite the control piston 19. This end is indicated in the drawing with the reference numeral 29. A control member 30 is slidably and sealingly mounted within the tubular body of the distributor piston 28 and defines a third chamber 31 within the said tubular body. The third chamber 31 communicates, by means of radial passages 32 formed in the tubular body of the distributor piston 28, with two apertures (inlet and outlet) 33, 34 formed in the body 15 of the distributor device. The inlet aperture 33 of the distributor device communicates with a delivery duct 35 connected to the output of the volumetric pump 11, whilst the output aperture 34 communicates with a return duct 36 connected to the reservoir 9.

The end 37 of the control member 30 which faces the interior of the tubular body of the distributor piston 28, is formed as a valve shutter and is cooperable with an annular valve seat 37a formed in the inner surface of the tubular body of the piston 28, to interrupt communication between the inlet aperture 33 and the outlet aperture 34. The opposite end of the control member 30 is located outside the tubular body of the distributor piston 28 and is itself formed in such a way as to constitute a valve shutter 38 cooperable with the mouth of the passage 24 formed in the control piston 19, to interrupt communication between the second chamber 20 and the duct 26 connected to the reservoir 9.

The closed end 29 of the tubular body of the distributor piston 28 constitutes a valve shutter displaceable from a cooperating annular valve seat 39 formed in the wall of the cylindrical cavity 16, to place the third chamber 31 in communication with the part of the second chamber 20 which lies between the said end 29 of the distributor piston 28 and the end part of the cavity 16 defined by the closure element 18. Helical springs 40, 41 are interposed, respectively, between the shutter 29 and the closure element 18, and between the control piston 19 and the distributor piston 28.

The first distributor device 13 which controls the operation of the hydraulic actuator 12 for controlling the steering of the motor vehicle, is inserted in the return duct 36 which connects the outlet aperture 34 of the second distributor device 14 with the reservoir 9. The device 13 is of the conventional type comprising a body 42 in which there is slidably mounted a movable member 43 connected by means of a mechanical transmission 44 to the steering wheel 45 of the motor vehicle. Two helical springs 46 are disposed within the body 42 and serve to bias the movable member 43 into an equilibrium position corresponding to the neutral position of the steering wheel 45. The body 42 is provided with an inlet 47 and with two outlets 48 connected to the reservoir 9. The interior cavity of the body 42 also communicates, by means of two ducts 49, with two chambers 50 defined within the hydraulic actuator 12 by a piston 51. The piston 51 has a piston rod 52 which is connected by means of a rigid connection 53 to the body 42 in such a way as to obtain the reverse action effect which, in a known way, returns the distributor device 13 back to its neutral position after each operation of the system, in a self regulating manner. When the movable member 43 is in its neutral position the aperture 47 communicates with the two outputs 48 and therefore with the reservoir 9. When, in the other hand, the movable member 43 is displaced from its neutral position, the input 47, which is connected by means of the duct 36, the third chamber 31 of the distributor device 14, and the duct 35, with the delivery of the volumetric pump 11, communicates with one of the two chambers 50 of the hydraulic actuator 12.

The operation of the system described above is as follows:

When the brake pedal 9 is depressed, this causes a displacement of the main piston 8 of the master cylinder towards the left as seen in the drawings. As a consequence of this displacement the master cylinder 1 generates a pressure in the ducts 2, 3 connected with the braking circuits 4,5 of the front and rear wheels of the motor vehicle in a similar manner to that which is described and illustrated in the above cited Italian Patent Application No. 69786-A/75. The pressure set up in the ducts 2,3 is also communicated by means of the apertures 21, 22 formed in the body 15 of the second distributor device 14, to the end surfaces of the auxiliary control piston 23 and to the end surface of the control piston 19 which faces the piston 23. In the absence of a force applied to the brake pedal 9, the pistons 23,19 are maintained in their end-of-path positions nearest the closure element 17 by the helical spring 41 interposed between the piston 19 and the piston 28. This latter, in its turn, is maintained in its end-of-path position corresponding to engagement of the valve shutter end 29 against the valve seat 39 by the helical spring 40 interposed between the piston 28 and the closure element 18. In such conditions the liquid supplied by the volumetric pump 11 through the delivery duct 35 enters into the third chamber 31 of the distributor device 14 through the inlet aperture 33 and flows out from the said chamber through the outlet aperture 34 from where it flows through the duct 36 and the distributor device 13 to be discharged into the reservoir 9. When, following depression of the brake pedal 9, the pressure generated in the braking circuits 4,5 by the master cylinder 1 is transmitted to the control pistons 19, 23, the auxiliary control piston 23 remains in its end-of-path position against the closure element 17 inasmuch as its end surfaces, which have the same area, are subjected to the same pressure. The control piston 19, on the other hand, because of the pressure exerted by the liquid through the aperture 22 on its end facing towards the piston 23, becomes displaced towards the right, as seen in the drawings, overcoming the reaction of the spring 41, until the mouth of the passage 24 is carried into contact with the valve shutter 38 constituted by the end of the control member 37. In this way communication between the second chamber 20 and the duct 26 connected with the reservoir 9 is interrupted. As it continues its movement towards the right, the control piston 19 displaces the control member 30 until its end 37 formed as a valve shutter is carried into contact with the valve seat 37a and consequently interrupts communication between the inlet aperture 33 and the outlet aperture 34. This interruption creates a pressure in the third chamber 31 which is connected through the inlet aperture 33 and the delivery duct 35 with the output of the volumetric pump 11. Once the end 37 of the control member 30 has seated on the valve seat 37a of the tubular body of the distributor piston 28, this latter is pushed towards the right, as seen in the drawing, following a further displacement of the control piston 19. In this way, the end 29 of the distributor piston 28, which end is formed as a valve shutter, moves away from its valve seat 39 overcoming the reaction of the helical spring 40 and places the third chamber 31 in communication, via the passage 27, with the cylindrical cavity 7 in which the main piston 8 of the master cylinder 1 is slidably mounted. The pressure which was generated in the third chamber 31 is thus applied to the piston 8 in such a way as to assist the force applied to the brake pedal 9. The same pressure is also transmitted by means of the passage 26 to the part of the second chamber 20 which lies between the control piston 19 and the distributor piston 28. The distributor piston 28 is therefore subjected to the same pressure at its two ends so that, urged by the helical spring 40, it returns to its end-of-path position corresponding to engagement of the valve shutter end 29 against the valve seat 39. If the pressure in the chamber 20 is greater than the pressure transmitted through the duct 2 and the aperture 22, the control piston 19 is displaced towards the left, as viewed in the drawing, putting the passage 24 in communication with the chamber 20 in such a way as to permit the liquid contained in the chamber 20 to discharge into the reservoir 9 through the duct 26. Communication between the chamber 20 and the reservoir 9 is interrupted again when the pressure in the chamber 20 falls to such a value that the control piston 19 is again displaced towards the right and carries the mouth of the passage 24 into contact with the valve shutter 38. During this phase, the control member 30 can move within the tubular body of the distributor piston 28, to enable its end 37 formed as a valve shutter to lift off from the valve seat 37a in such a way as to maintain a pressure in the third chamber 31 equal to the pressure existing in the second chamber 20.

When the brake pedal 9 is released the piston 8 returns to its initial position under the thrust of resilient means of known type (not illustrated) with which the master cylinder 1 is provided. Since the pressure exerted through the duct 2 on the control piston 19 ceases, this latter becomes displaced towards the left, as seen in the drawing, under the thrust of the helical spring 41. The mouth of the passage 24 moves away from the valve shutter 38 putting the second chamber 20 in communication with the passages 26, 27 and putting the cavity 7 in communication with the reservoir 9.

In the event of a rupture of the duct 2 connected to the aperture 22, then following depression of the brake pedal 9, the auxiliary control piston 23 becomes displaced towards the right, as viewed in the drawing, under the urging of the pressure exerted on its end surface facing the closure element 17 through the duct 3 and the aperture 21. Upon being displaced towards the right the piston 23 presses the control piston 19 in the direction of the valve shutter 38 thus ensuring the operation of the distributor device 14 even in the event of the said accident happening.

Considering only the effect on the control device for the steering of the motor vehicle, operation of the steering wheel 45 causes the movable member 43 to be displaced from its equilibrium position corresponding to the straight-ahead or neutral position of the steering wheel 45. The output of the volumetric pump 11 is thus placed in communication through the duct 35, the input aperture 33, the third chamber 31, the output aperture 34, the duct 36, the input 47 and one of the two ducts 49, with one of the chambers 50 of the hydraulic actuator 12. When the movable member 43 returns to its neutral position the liquid supplied by the volumetric pump 11 goes back to being discharged into the reservoir 9 through the output 48.

If, after the steering wheel 45 of the motor vehicle has been turned, the brake pedal 9 is also depressed, the operation of the device is as follows: when the steering wheel 45 is turned the movable member 43 of the distributor device 13 is displaced from its neutral position interrupting communication between the aperture 47 and the output 48. Consequently there is created a pressure in the circuit constituted by the delivery duct 35, the third chamber 31 of the distributor device 14 and the part of the return duct 36 which connects the output aperture 34 with the input 47 of the distributor device 13. The pressure existing in the third chamber 31 maintains the control member 30 in its end-of-path position in the direction of the end of the piston 28 which faces the control piston 19. When the brake pedal 9 is depressed the pressure transmitted through the ducts 2, 3 to the apertures 21, 22 causes, as described previously, the displacement of the control piston 19 towards the right as viewed in the drawing. The piston 19 is displaced until the mouth of the passage 24 is carried into contact with the valve shutter 38. A further displacement of the control piston 19 causes a corresponding displacement of the distributor piston 28 since the control member 30 is effectively rigidly connected to the piston 28 by the pressure existing in the chamber 31. The displacement of the piston 28 causes displacement of the valve shutter end 29 from the valve seat 39 so that communication is established between the third chamber 31 and the passages 26, 27 and the cylindrical cavity 7 of the master cylinder. The pressure generated by the volumetric pump 11 is thus applied to the main piston 8 of the master cylinder 1 assisting the force applied to the brake pedal 9. From this point onwards the operation of the distributor device 14 is identical to that previously described.

We claim:

1. An hydraulic system for a motor vehicle provided with servo assisted controls for the brakes and the steering, the said system comprising:
   a reservoir, a volumetric pump the input of which is connected to the said reservoir, a master cylinder having a main piston operable by means of the brake pedal to generate pressure in the motor vehicle's wheel braking circuits, an hydraulic actuator for the control of the steering, a first distributor device associated with the said hydraulic actuator and controlled by the steering wheel of the motor vehicle to transmit the pressure generated by the volumetric pump to the said actuator, a second distributor device associated with the brake master cylinder and controlled by the pressure existing in the said braking circuit to transmit the pressure generated by the volumetric pump to the said main piston of the master cylinder, whereby to assist the force applied to the brake pedal when an increase in pressure occurs in the said braking circuit following operation of the brake pedal, the said second distributor device comprising:

a body forming part of the body of the master cylinder and provided internally with a cyindrical cavity, a control piston, slidably and sealingly mounted within the cylindrical cavity and defining within this cavity a first chamber communicating with the wheel braking circuit of the motor vehicle, and a second chambe which communicates with the said reservoir by means of a passage formed in the control piston and with an input aperture formed in the body of the second distributor device, the said input aperture being connected with the output of the volumetric pump by means of a delivery duct, and with a cavity of the master cylinder in which there is slidably mounted the main piston of the master cylinder, and a valve shutter member cooperating with the mouth of the passage formed in the control piston to interrupt communication between the second chamber and the reservoir, said second distributor device further comprising:

a distributor piston slidably and sealingly mounted in the said second chamber and having a tubular body closed at its end opposite the control piston whereby to divide the second chamber into two parts which both communicate with the interior of the master cylinder a control member slidably and sealingly mounted within the tubular body of the distributor piston, whereby to define within the said tubular body a third chamber which communicates by means of radial passages formed in the tubular body both with the said input aperture and with an output aperture formed in the body of the second distributor device, the said output aperture being connected with the said reservoir by means of a return duct in which the said first distributor device is inserted; the end of the said control member which faces the interior of the tubular body being formed as a valve shutter and being cooperable with an annular valve seat formed in the internal surface of the tubular body to interrupt communication between the said input and output apertures; the said opposite end of the control member being disposed outside the tubular body and constituting the said shutter member; the tubular body of the distributor piston having its closed end formed as a valve shutter displaceable from a cooperating annular valve seat formed in the wall of the said cylindrical cavity to place the said third chamber in communication with the part of the second chamber which lies between the distributor piston and an end wall of the cylindrical cavity, first resilient means interposed between the distributor piston and the end wall of the said cylindrical cavity in order to urge that end of the distributor piston which is formed as a valve shutter against its valve seat, and second resilient means interposed between the control piston and the distributor piston.

2. An hydraulic system according to claim 1, in which the master cylinder controls two independent braking circuits respectively associated with the front wheels and the rear wheels of the motor vehicle, characterised by the fact that the said second distributor device further comprises an auxiliary control piston which is slidably and sealingly mounted in the said cylindrical cavity between the control piston and an end wall of the cylindrical cavity, and which divides the first chamber into two parts communicating, respectively, with the braking circuits of the front wheels and the rear wheels of the motor vehicle.

* * * * *